United States Patent [19]

Altman

[11] Patent Number: 4,647,422
[45] Date of Patent: Mar. 3, 1987

[54] THREE-COORDINATE POSITIONING APPARATUS FOR THE INSPECTION AND MAINTENANCE OF NUCLEAR REACTOR COMPONENTS

[75] Inventor: Denis J. Altman, Jeannette, Pa.

[73] Assignee: Westinghouse Electric Corp., Pittsburgh, Pa.

[21] Appl. No.: 731,825

[22] Filed: May 8, 1985

[51] Int. Cl.⁴ .............................................. G21C 17/00
[52] U.S. Cl. .................................... 376/260; 376/249; 376/262; 376/353
[58] Field of Search ............... 376/248, 249, 260, 262, 376/272, 353

[56] References Cited

U.S. PATENT DOCUMENTS

| | | | |
|---|---|---|---|
| 3,914,613 | 10/1975 | Shallenberger et al. | 376/248 |
| 4,048,009 | 9/1977 | Weilbacher | 376/245 |
| 4,169,758 | 10/1979 | Blackstone et al. | 376/249 |
| 4,217,173 | 8/1980 | Jabsen | 376/251 |
| 4,290,906 | 9/1981 | Saito | 376/272 |
| 4,311,556 | 1/1982 | Iwamoto et al. | 376/249 |
| 4,464,332 | 8/1984 | Boisseuil et al. | 376/215 |
| 4,499,046 | 2/1985 | Castrec et al. | 376/249 |

Primary Examiner—M. Jordan
Attorney, Agent, or Firm—Daniel C. Abeles

[57] ABSTRACT

In the upper internals storage pit of a containment building housing a pressurized water nuclear reactor, there is installed a three-coordinate positioning apparatus which has a frame-like, horizontally oriented base track enclosing an area designed to be occupied by any of the control rod clusters when lowered from the upper internals supported in the storage pit; a mechanism for supporting and vertically displacing the base track in the storage pit; a traversing track supported on the base track for back-and-forth displacement in a first horizontal direction; a mechanism for moving the traversing track in the first horizontal direction; and a carriage supported on the traversing track for back-and-forth displacements in a second horizontal direction perpendicular to the first horizontal direction. The carriage is adapted to receive thereon inspection equipment. The positioning apparatus further has a mechanism for moving the carriage in the second horizontal direction; and an access track situated in the storage pit externally of and horizontally spaced from the area enclosed by the base track. The access track is arranged to be alignable by the traversing track to provide transferability of the carriage from the traversing track to the access track and conversely. The carriage is directly accessible from an operating floor above the storage pit when the carriage is on the access track.

6 Claims, 4 Drawing Figures

THREE-COORDINATE POSITIONING APPARATUS FOR THE INSPECTION AND MAINTENANCE OF NUCLEAR REACTOR COMPONENTS

BACKGROUND OF THE INVENTION

1. Field of the Invention

This invention relates to a positioning apparatus in combination with a nuclear reactor to provide for the maintenance and inspection of certain nuclear reactor components within the containment building.

During the periodical refueling operations in nuclear reactors of the pressurized water type, contents of the pressure vessel are removed in groups and stored within the containment building in assigned areas. Thus, the upper internals of the reactor, together with control rod assemblies (clusters) are transferred from the reactor pressure vessel into the upper internals storage pit where these components are supported on a storage stand installed in the storage pit. The invention utilizes the refueling outage of the nuclear reactor to perform inspection and maintenance work on the rodlets of the control rod clusters and components of the upper internals while the latter are stowed in the upper internal storage pit. A periodic inspection of the rodlets after their installation has not been routinely performed; for any inspection work the control rod clusters have been entirely removed from the internals.

2. Description of the Prior Art

U.S. Pat. No. 4,217,173 to Jabsen discloses a nuclear reactor inspection device which includes a carriage and beam construction mounted on the top edge of a reactor vessel and which is adapted to raise and lower vertical scanner tubes to be aligned with desired fuel rods in the reactor core, for inspecting the structural integrity of the nuclear reactor fuel rods without the need of dismantling the fuel assemblies.

U.S. Pat. No. 4,048,009 to Weilbacher discloses a vertically displaceable carriage on which measuring instruments are mounted for checking dimensions of individually positioned control rod extensions in a cooling pit during periodical preventive maintenance checks.

U.S. Pat. Nos. 4,169,758 to Blackstone et al. and 4,311,556 to Iwamoto et al. disclose apparatuses for inspecting the internal surface of a nuclear reactor vessel. The apparatuses are supported above the reactor vessel and are rotatable about a circular track and are radially displaceable in the horizontal direction relative to the circular track and are also movable vertically. On the vertically movable component an additional mechanism for further horizontal and angular displacements is provided which supports inspecting instruments.

U.S. Pat. No. 4,464,332 to Boisseuil et al. describes an apparatus for verifying rod spacings in a nuclear fuel assembly. The apparatus is vertically movable parallel to a vertically positioned nuclear fuel assembly and has components which are displaceable in horizontal directions. The apparatus is designed to verify new fuel assemblies after their manufacture.

SUMMARY OF THE INVENTION

It is an object of the invention to provide an improved positioning apparatus for accessing the space beneath the stored upper internals for inspection and maintance of control rods and components of the upper internals without the need for dismantling them from the upper internals and which is adapted to operate in the upper internals storage pit during the refuelling outage.

This object and others to become apparent as the specification progresses, are accomplished by the invention, according to which, briefly stated, in the upper internals storage pit there is installed a three-coordinate positioning apparatus which has a frame-like, horizontally oriented base track enclosing an area designed to be occupied by any of the control rod clusters when lowered from the upper internals supported in the storage pit; a mechanism for supporting and vertically displacing the base track in the storage pit; a traversing track supported on the base track for back-and-forth displacement in a first horizontal direction; a mechanism for moving the traversing track in the first horizontal direction; and a carriage supported on the traversing track for back-and-forth displacements in a second horizontal direction perpendicular to the first horizontal direction. The carriage is adapted to receive thereon inspection equipment. The positioning apparatus further has a mechanism for moving the carriage in the second horizontal direction; and an access track situated in the storage pit externally of and horizontally spaced from the area enclosed by the base track. The access track is arranged to be alignable by the traversing track to provide transferability of the carriage from the traversing track to the access track and conversely. The carriage is directly accessible from an operating floor above the storage pit when the carriage is on the access track.

DESCRIPTION OF THE PREFERRED EMBODIMENT

Figure 1:
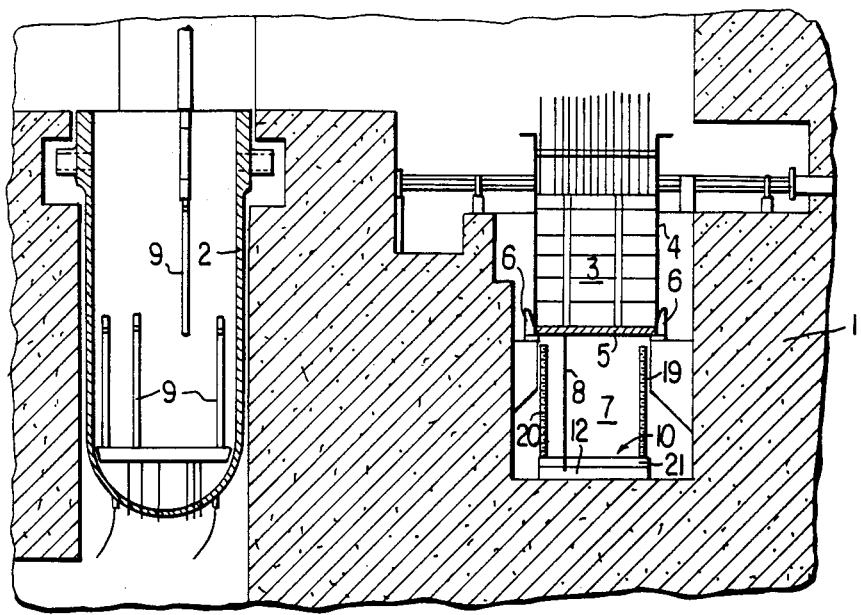
FIG. 1 is a schematic fragmentary side elevational view of a pressurized water nuclear reactor containment building, incorporating the invention.
Figure 2:
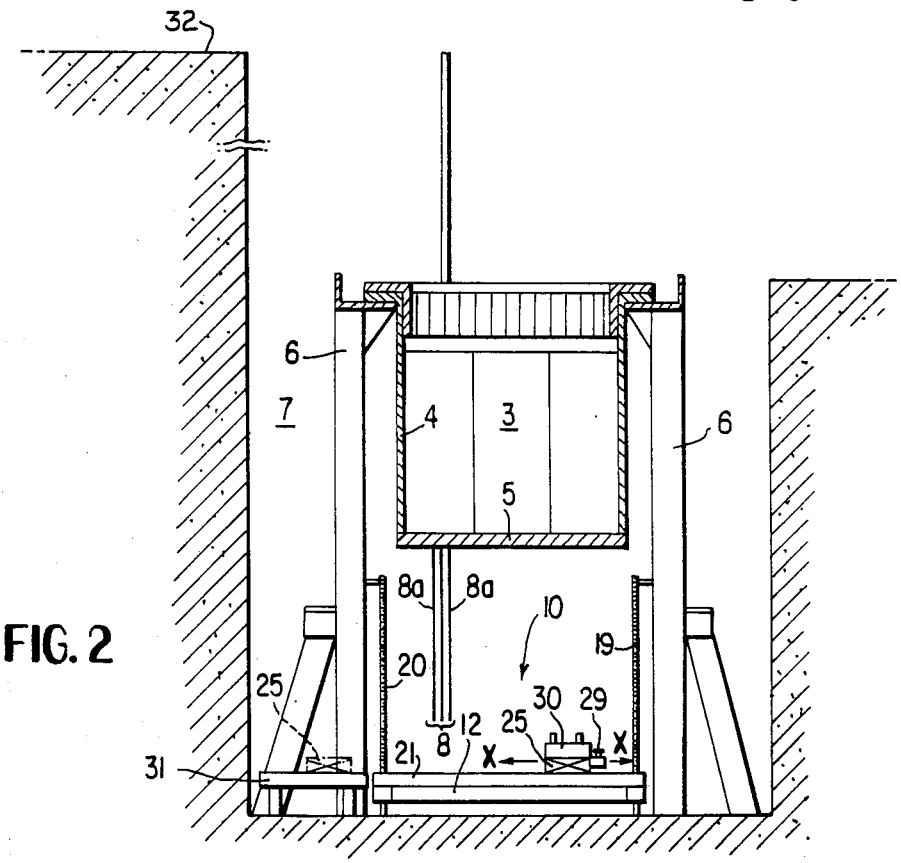
FIG. 2 is an enlarged schematic side elevational view, partially in section, of one part of the structure shown in FIG. 1, with some components arranged slightly differently.

Turning to FIG. 1, there is illustrated one part of a containment building 1 housing the components of a pressurized water nuclear reactor. FIG. 1 depicts the nuclear reactor during refueling outage, with part of the contents of the nuclear pressure vessel 2 removed and stored at different locations of the containment building. Thus, the upper internals 3 of the nuclear reactor enclosed in the upper internals casing 4 and bounded at the bottom by the upper core support plate 5 are positioned during refueling on the upper internals storage stand 6 in the upper internals storage pit 7. The upper internals 3 include a plurality of control rod clusters 8 withdrawn previously from the fuel assemblies 9. Each control rod cluster 8 has a plurality of (for example 24) parallel spaced rodlets 8a (FIG. 2). The control rod clusters 8 may be individually lowered from the upper internals casing 4 through the upper core support plate 5 into the space of the pit 7 underneath the upper core support plate 5. FIG. 1 further shows that the unrodded fuel assemblies 9 (including fuel rods and rodlet guide thimbles) are being moved from the reactor vessel 2 for refueling.

During the time period the upper internals 3 are stored on the storage stand 6, the rodlets 8a of the control rod clusters 8 are inspected in the upper internals storage pit 7, for example, by means of a television camera mounted on a positioning apparatus generally designated at 10.

Figure 3:
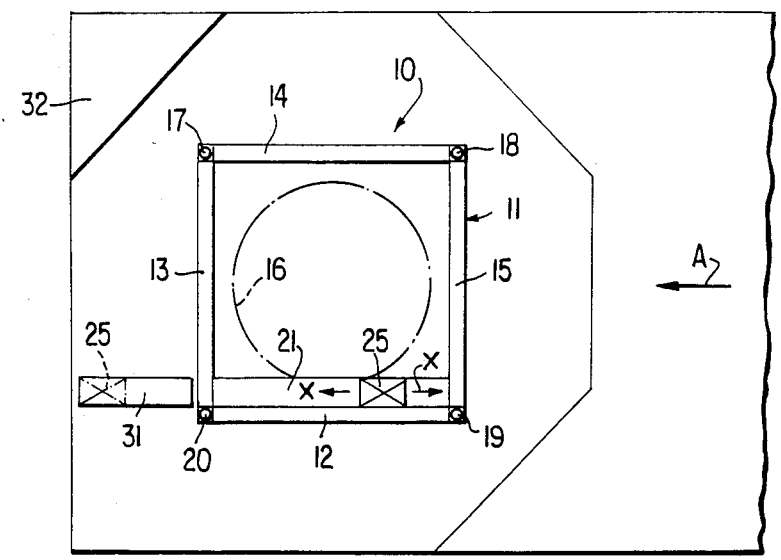
FIG. 3 is a schematic top plan view of the construction illustrated in FIG. 2, with some components removed for clarity.
Figure 4:
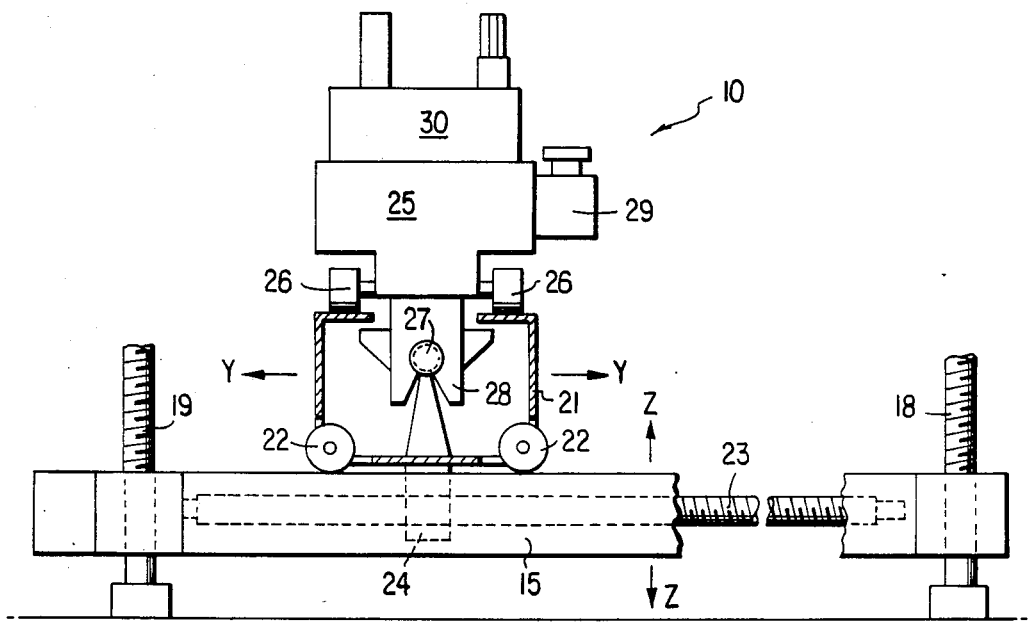
FIG. 4 is an enlarged schematic side elevational view, partially in section, of the preferred embodiment of the invention.

In the description which follows, details of the positioning apparatus 10 will be set forth, with particular reference to FIGS. 2, 3 and 4.

The positioning apparatus 10 comprises a horizontally oriented base track 11 which is constituted by a rectangular frame formed of beams 12, 13, 14 and 15. The base track 11 encloses a sufficiently large area of the upper internals storage pit 7 to ensure that the control rod clusters 8 when lowered individually or in a row, will occupy a zone surrounded by the base track 11. The vertical projection of the zone within which the control rod clusters 8 are supported in the upper internals 3 is designated with a circle 16 in FIG. 3.

The base track 11 is, at its four corners, supported on four vertical elevating screws 17, 18, 19 and 20 mounted on the floor of the storage pit 7. The elevating screws 17-20 are driven in unison by a non-illustrated drive for raising or lowering the base track 11 while maintaining its horizontal orientation. Thus, the displacement of the base track 11 supplies the vertical or Z-component of the three-coordinate positioning apparatus 10 according to the invention.

On the base track 11 there is supported a traversing track 21 which extends parallel to the frames 12 and 14 of the base track 11 and which is displaceable horizontally in a direction along the frames 13 and 15 and is, for this purpose, provided with runner wheels 22 engaging the top face of the frames 13 and 15. Within the frames 13 and 15 there extend respective horizontal drive screws 23 (only one shown) which are in threaded engagement with travel nuts 24 (only one shown) affixed to the underside of the traversing track 21 at opposite longitudinal ends thereof. The horizontal drive screws 23 are driven in unison by a non-illustrated power mechanism to provide for a linear displacement of the traversing track 21 to thus supply the horizontal "Y"-motion of the three-coordinate positioning apparatus 10 according to the invention.

A carriage 25 is movably supported on a top face of the traversing track 21 by means of runner wheels 26. Within the hollow traversing track 21 there extends a longitudinal traversing screw 27 which threadedly engages a travel nut 28 affixed to the underside of the carriage 25. The traversing screw 27 may be rotated, for example, by a non-illustrated motor carried at one end of the traversing track 21 to thus cause a linear travel of the carriage 25 in a horizontal direction which is perpendicular to the direction of travel of the traversing track 21. The motion of the carriage 25 thus supplies the horizontal "X"-component of the three-coordinate positioning apparatus 10 according to the invention.

On the carriage 25 there are mounted an inspection device such as a television camera 29 and various maintenance tools 30, all operable, for example, by remote control in a known manner.

At the bottom of the upper internals storage pit 7, adjacent to the area occupied by the base track 11, there is situated a generally horizontal access track 31 which extends parallel to the traversing track 21. By appropriate vertical and horizontal positioning of the base track 11 and the traversing track 21, respectively, the traversing track 21 may be brought into linear alignment with the access track 31 as depicted in FIGS. 2 and 3. In such an aligned state between the two tracks 21 and 31 the carriage 25 may be rolled off the traversing track 21 onto the access track 31, to thus assume a position in a zone lateral to the upper internals storage stand 6. Such zone which is directly accessible from the operating floor 32 above the storage pit 7, provides a convenient space for removing tools or inspecting instruments from, and installing them on the carriage 25 preparatory or subsequent to an inspection or maintenance cycle.

Thus, during the refuelling outage, after the upper internals 3 are positioned on the upper internals storage stand 6 in the water-filled storage pit 7, the inspection of the rodlets 8a may be performed. For this purpose, a limited number of control rod clusters 8 are lowered from the upper internals 3 into the space therebelow. In the lowered position, the top structures (spiders) of the control rod clusters are adjacent the upper core support plate 5 and thus the clusters are suspended therefrom. The number of control rod clusters 8 lowered into their inspection-ready position is so selected as to ensure that the carriage 25 of the positioning apparatus 10 is at all times capable of being moved to any desired location necessary for performing the inspection work on the lowered, vertically positioned rodlets 8a of the control rod clusters 8.

It will be understood that the above description of the present invention is susceptible to various modifications, changes and adaptations, and the same are intended to be comprehended within the meaning and range of equivalents of the appended claims.

What is claimed is:

1. In a nuclear reactor system including a containment building, a nuclear reactor accommodated in the containment building and having upper internals supporting a plurality of control rod clusters lowerable from the upper internals and each having a plurality of vertically oriented rodlets; a storage pit in the containment building; a storage stand installed in the storage pit and arranged for supporting and storing said upper internals removed from said nuclear reactor; the improvement comprising a positioning apparatus installed in said storage pit underneath a space designed for accommodating said upper internals; said apparatus including (a) a frame-like, horizontally oriented base track enclosing an area designed to be occupied by any of said control rod clusters when lowered from said upper internals;
(b) means for supporting and vertically displacing said base track in said storage pit;
(c) a traversing track supported on said base track for back-and-forth displacement in a first horizontal direction;
(d) means for moving said traversing track in said first horizontal direction;
(e) a carriage supported on said traversing track for back-and-forth displacements in a second horizontal direction perpendicular to said first horizontal direction; said carriage being adapted to receive thereon inspection equipment;
(f) means for moving said carriage in said second horizontal direction; and (g) an access track situated in said storage pit externally of and horizontally spaced from the area enclosed by said base track; said access track being arranged to be alignable by said traversing track to provide transferability of said carriage from said traversing track to said access track and conversely; said carriage being directly accessible from an operating floor above said storage pit when said carriage is on said access track.

2. A nuclear reactor system as defined in claim 1, wherein said base track includes four beams forming a rectangular frame.

3. A nuclear reactor system as defined in claim 1, wherein said means for supporting and vertically displacing said base track comprises a plurality of vertically supported, rotatable elevating screws operatively connected with said base track.

4. A nuclear reactor system as defined in claim 1, wherein said means for moving said traversing track includes a rotatable horizontal drive screw oriented parallel to said first horizontal direction and supported by said base track and a travel nut affixed to said traversing track and threadedly engaging said horizontal drive screw.

5. A nuclear reactor system as defined in claim 1, wherein said means for moving said carriage includes a rotatable horizontal traversing screw oriented parallel to said second horizontal direction and supported by said traversing track and a travel nut affixed to said carriage and threadedly engaging said horizontal traversing screw.

6. A nuclear reactor system as defined in claim 1, wherein said base track includes four beams forming a rectangular frame; said means for supporting and vertically displacing said base track comprises a plurality of vertically supported, rotatable elevating screws operatively connected with said base track; said means for moving said traversing track includes a rotatable horizontal drive screw oriented parallel to said first horizontal direction and supported by said base track and a first travel nut affixed to said traversing track and threadedly engaging said horizontal drive screw; said means for moving said carriage includes a rotatable horizontal traversing screw oriented parallel to said second horizontal direction and supported by said traversing track and a second travel nut affixed to said carriage and threadedly engaging said horizontal traversing screw.

* * * * *